(12) United States Patent
Hirai et al.

(10) Patent No.: US 12,450,911 B2
(45) Date of Patent: Oct. 21, 2025

(54) INFORMATION OUTPUT SYSTEM, INFORMATION OUTPUT METHOD, AND INFORMATION OUTPUT PROGRAM

(71) Applicant: TOYOTA JIDOSHA KABUSHIKI KAISHA, Toyota (JP)

(72) Inventors: Tooru Hirai, Toyota (JP); Shintaro Yoshizawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 126 days.

(21) Appl. No.: 18/519,655

(22) Filed: Nov. 27, 2023

(65) Prior Publication Data
US 2024/0193952 A1    Jun. 13, 2024

(30) Foreign Application Priority Data
Dec. 8, 2022   (JP) ................................. 2022-196473

(51) Int. Cl.
*G06V 20/52* (2022.01)
*G06Q 10/0631* (2023.01)
(Continued)

(52) U.S. Cl.
CPC ....... *G06V 20/52* (2022.01); *G06Q 10/06316* (2013.01); *G06T 7/70* (2017.01); *G06V 20/60* (2022.01); *G06V 40/10* (2022.01); *G06T 2207/30164* (2013.01); *G06T 2207/30196* (2013.01)

(58) Field of Classification Search
CPC ........ G06V 20/52; G06V 40/10; G06V 20/60; G06T 7/70; G06T 2207/30164; G06T 2207/30196; G06Q 10/06316
See application file for complete search history.

(56) References Cited

U.S. PATENT DOCUMENTS

| | | | |
|---|---|---|---|
| 2016/0219266 A1* | 7/2016 | Lane | ......................... A43D 1/04 |
| 2024/0036561 A1* | 2/2024 | Nakano | ................... G06F 30/10 |

(Continued)

FOREIGN PATENT DOCUMENTS

JP    2021048804 A    4/2021

OTHER PUBLICATIONS

Xue Yang, Evaluation of visualization techniques for use by facility operators during monitoring tasks, 2014, p. 103-118 (Year: 2014).*

*Primary Examiner* — Ibrahim N El-Bathy
(74) *Attorney, Agent, or Firm* — Dinsmore & Shohl LLP

(57) ABSTRACT

An information output system according to this embodiment includes: image acquisition means for acquiring an image of a work space including an AGV, a plurality of components, and a worker; determination means for determining a component to be mounted to the AGV based on mobile object information and the like indicating the AGV shown in the acquired image; and image projection means for projecting a projection image including a reference projection image and the like indicating the component determined to be mounted to the AGV, in which: the determination means generates a layout for changing a position of a component based on an analysis of a flow line along which the worker moves in the work space; and the image projection means projects a projection image indicating the changed position of the component in the layout.

9 Claims, 14 Drawing Sheets

(51) Int. Cl.
  *G06T 7/70*    (2017.01)
  *G06V 20/60*   (2022.01)
  *G06V 40/10*   (2022.01)

(56) References Cited

U.S. PATENT DOCUMENTS

2024/0211880 A1\*  6/2024  Johnson ................ H04W 4/029
2024/0273907 A1\*  8/2024  Takeuchi ............... G06V 20/52

\* cited by examiner

| AGV | COMPONENTS, MOUNTING ORDER |
|---|---|
| AGV51 | COMPONENT 61, COMPONENT 62, COMPONENT 63, ··· |
| AGV52 | COMPONENT 61, COMPONENT 63, COMPONENT 64, ··· |
| AGV53 | COMPONENT 61, COMPONENT 62, COMPONENT 64, ··· |
| ··· | ··· |

Fig. 2

| AGV | FLOW LINE (FOR EACH WORKER) |
|---|---|
| AGV51 | FLOW LINE 81(WORKER 71), FLOW LINE 82(WORKER 72)··· |
| AGV52 | FLOW LINE 81(WORKER 71), FLOW LINE 83(WORKER 73)··· |
| AGV53 | FLOW LINE 82(WORKER 72), FLOW LINE 83(WORKER 73)··· |
| ··· | ··· |

INFORMATION OUTPUT SYSTEM, INFORMATION OUTPUT METHOD, AND INFORMATION OUTPUT PROGRAM

CROSS REFERENCE TO RELATED APPLICATIONS

This application is based upon and claims the benefit of priority from Japanese patent application No. 2022-196473, filed on Dec. 8, 2022, the disclosure of which is incorporated herein in its entirety by reference.

BACKGROUND

The present disclosure relates to an information output system, an information output method, and an information output program.

Japanese Unexamined Patent Application Publication No. 2021-048804 (hereinafter also referred to as Patent Literature 1) discloses a technology for outputting information about work, including a work method and a sequence of the work, for a worker by performing illumination displaying in a work environment.

SUMMARY

The technology disclosed in Patent Literature 1 is intended for work to be done on a tabletop. Therefore, it is difficult to output information between tasks in a more complex work space where there could be a plurality of moving objects by the illumination displaying. Even if work to be performed in a complex work space is extracted by machine learning or the like, appropriate information may not necessarily be output between tasks because working abilities vary from one worker to another. There has thus been a demand for an information output system capable of appropriately displaying information between tasks in a complex work space.

The present disclosure has been made to solve the above-described problem and an object thereof is to provide an information output system, an information output method, and an information output program capable of appropriately providing information.

An information output system according to an embodiment includes: image acquisition means for acquiring an image of a work space including a mobile object, a plurality of components, and at least one worker; determination means for determining a component to be mounted to the mobile object based on at least one of first mobile object information indicating the mobile object in the acquired image, second mobile object information indicating a time when the mobile object appears in the work space, and third mobile object information indicating a position in which the mobile object is located before the mobile object appears in the work space; and image projection means for projecting a projection image including at least one of a first reference projection image indicating the component determined to be mounted to the mobile object, a second reference projection image indicating which of mobile objects appearing in the work space the component should be mounted to, and a third reference projection image indicating a housing position of the mobile object, in which the determination means generates a layout in which a position of the component in the work space is changed based on an analysis of a flow line along which the worker moves in the work space, and the image projection means projects the projection image indicating the changed position of the component in the layout.

In the above-described information output system, the determination means determines an order according to which the plurality of components are mounted to the mobile object, and the image projection means projects a projection image indicating the order according to which the plurality of components are mounted to the mobile object.

In the above-described information output system, when the component is mounted to the mobile object, the image acquisition means acquires a plurality of flow lines along which a plurality of different workers move in the work space, and the determination means generates the layout in which the component is disposed so that a part of the flow lines of the plurality of different workers where a difference therebetween is large is shortened.

In the above-described information output system, when a difference between flow lines of the plurality of different workers from a second component to a third component is larger than that between flow lines of the plurality of different workers from a first component to the second component, the determination means generates the layout in which a position of the third component is changed.

An information output method according to an embodiment including: acquiring an image of a work space including a mobile object, a plurality of components, and at least one worker; determining a component to be mounted to the mobile object based on at least one of first mobile object information indicating the mobile object in the acquired image, second mobile object information indicating a time when the mobile object appears in the work space, and third mobile object information indicating a position in which the mobile object is located before the mobile object appears in the work space; projecting a projection image including at least one of a first reference projection image indicating the component determined to be mounted to the mobile object, a second reference projection image indicating which of mobile objects appearing in the work space the component should be mounted to, and a third reference projection image indicating a housing position of the mobile object; generating a layout in which a position of the component in the work space is changed based on an analysis of a flow line along which the worker moves in the work space; and projecting the projection image indicating the changed position of the component in the layout.

An information output program according to an embodiment causes a computer to: acquire, from image acquisition means, an image of a work space including a mobile object, a plurality of components, and at least one worker; determine a component to be mounted to the mobile object based on at least one of first mobile object information indicating the mobile object in the acquired image, second mobile object information indicating a time when the mobile object appears in the work space, and third mobile object information indicating a position in which the mobile object is located before the mobile object appears in the work space; make image projection means project a projection image including at least one of a first reference projection image indicating the component determined to be mounted to the mobile object, a second reference projection image indicating which of mobile objects appearing in the work space the component should be mounted to, and a third reference projection image indicating a housing position of the mobile object; generate a layout in which a position of the component in the work space is changed based on an analysis of a flow line along which the worker moves in the work space; and make the image projection means project the projection image indicating the changed position of the component in the layout.

According to the embodiment, it is possible to provide an information output system, an information output method, and an information output program capable of appropriately providing information.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 2 shows an example of information stored in determination means in the information output system according to the first embodiment;

DETAILED DESCRIPTION

The present disclosure will be described hereinafter through embodiments, but the present disclosure according to the claims is not limited to the below-shown embodiments. Further, not all of the components/structures described in the embodiments are indispensable as means for solving the problem. For clarifying the description, the following description and drawings are partially omitted and simplified as appropriate. Further, the same symbols are assigned to the same or corresponding components throughout the drawings, and redundant descriptions thereof are omitted as appropriate.

First Embodiment

An information output system according to a first embodiment will be described. In this embodiment, the information output system may be replaced with an information output apparatus, or the information output apparatus may be replaced with an information output system. Further, the information output system according to this embodiment may include an information output apparatus.

<Configuration of Information Output System>

Figure 1:
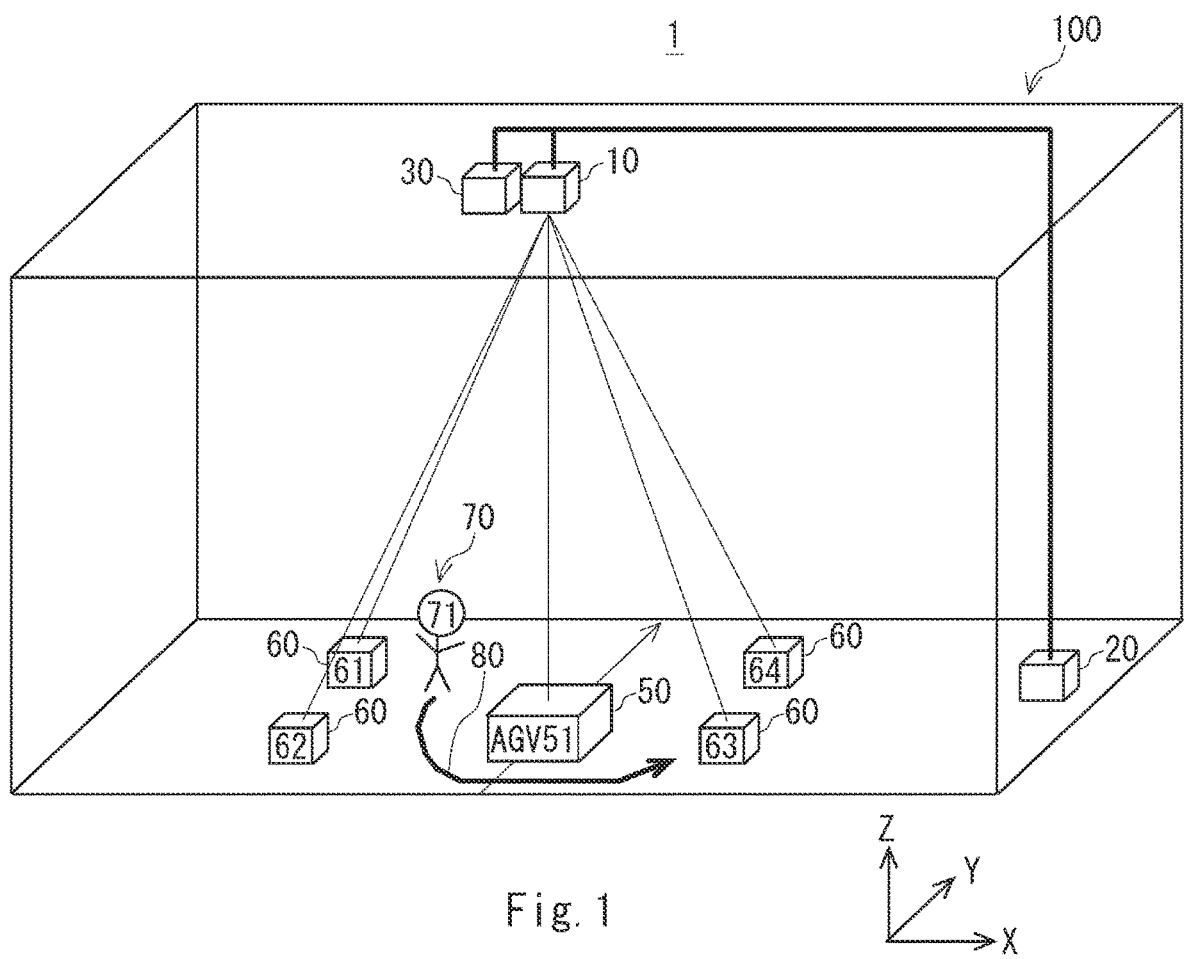
FIG. 1 is a schematic diagram showing an example of an information output system according to a first embodiment.

FIG. 1 is a schematic diagram showing an example of an information output system according to the first embodiment. As shown in FIG. 1, the information output system 1 is disposed in a certain work space 100. The work space 100 includes a mobile object, a plurality of components 60, and at least one worker 70. Examples of the mobile object include an automatic guides vehicle (hereinafter referred to as AGV (Automatic Guides Vehicle) 50). The following description will be given under the assumption that the mobile object is an AGV 50. In this case, the work space 100 includes the AGV 50, a plurality of components 60, and at least one worker 70. Note that the mobile object is not limited to wheel-driven-type conveyance vehicles, such as the AGV 50, that autonomously travel, but may also include various other mobile objects that can move without being driven by wheels, such as hovercraft-type mobile objects and linear-motor-type mobile objects. Further, examples of the mobile object may include not only those in which the traveling vehicle itself (the computing apparatus inside the moving vehicle) performs autonomous movement control, but also those in which an external server informs the traveling vehicle how to autonomously travel by transmitting a control signal and the like to the traveling vehicle, and those in which travelling control of the traveling vehicle is performed by a person through remote control. The work space 100 is, for example, a factory or the like in which a production line for assembling components 60 is installed. Note that the work space 100 is not limited to factories in which component assembly lines are installed, but may be a component distribution site, a component warehouse, or the like as long as it includes an AGV 50, a plurality of components 60, and at least one worker 70.

In the following description, for the sake of clarifying the explanation of the information output system 1, an XYZ-orthogonal coordinate system is introduced. The floor of the work space 100 is defined as an XY-plane and the direction perpendicular to the floor is defined as a Z-axis direction.

The information output system 1 includes position acquisition means, determination means 20, and image projection means 30. The position acquisition means includes, for example, image acquisition means 10. The following description will be given under the assumption that the position acquisition means is the image acquisition means 10. In this case, the information output system 1 includes the image acquisition means 10, the determination means 20, and the image projection means 30. Note that means other than the image acquisition means 10 may be used to acquire position information. For example, position information may be acquired by a sensor provided in the AGW 50 or by other environmental sensors or the like. The image acquisition means 10, the determination means 20, and the image projection means 30 of the information output system 1 are connected to each other by wired or wireless communication lines. The communication lines may be partly wired and partly wireless. In the information output system 1, at least two means from among the image acquisition means 10, the determination means 20 and the image projection means 30 may be integrated with each other, or each of them may be formed as separate means.

The image acquisition means 10 acquires an image of the work space 100 including the AGV 50, a plurality of components 60, and at least one worker 70. The image is, for example, a moving image. Alternatively, the image may be a still image. The image acquisition means 10 acquires an image of the work space 100 in real time. The image acquisition means 10 is, for example, a video camera. The image acquisition means 10 is, in embodiments, a PoE (Power over Ethernet)-type camera. Note that the image acquisition means 10 is not limited to the video camera, but may be a still camera, a radar, an infrared sensor, or the like as long as it can acquire an image of the work space 100.

The image acquisition means 10 is disposed, for example, on the ceiling of the work space 100 and is fixed so as to face downward. In this way, it is possible to acquire an image of the components 60 while eliminating any blind spots. Note that the image acquisition means 10 is not limited to those disposed on the ceiling of the work space 100, but may be disposed in any place in the work space 100, such as on the side (e.g., the wall surface) thereof or outside the work space 100 as long as it can acquire an image of the work space 100.

The determination means 20 determines, based on the AGV 50 shown in the acquired image, which of the components 60 should be mounted to the AGV 50. The determination means 20 is, for example, an information processing apparatus such as a PC (Personal Computer). The determination means 20 is, in embodiments, a PC equipped with a GPU (Graphics Processing Unit). Note that the determination means 20 is not limited to the information processing apparatus such as a PC, but may be a portable apparatus such as a smartphone or a tablet-type computer as long as it can determine the component 60 to be mounted to the AGV 50 based on the AGV 50 shown in the acquired image.

The determination means 20 may store AGVs 50 (e.g., names or serial numbers of AGVs 50) and components 60 (e.g., names or serial numbers of components 60) to be mounted to AGVs 50 in advance while associating them with each other. FIG. 2 shows an example of information stored by the determination means 20 in the information output system 1 according to the first embodiment.

As shown in FIG. 2, the determination means 20 stores AGVs 51 to 53 (i.e., their serial numbers) and a plurality of components 61 to 64 (i.e., their serial numbers) while associating them with each other. Specifically, the determination means 20 stores, for example, an AGV 51 and components 61, 62 and 63 while associating them with each other. Further, the determination means 20 stores information indicating that an order according to which the plurality of components 60 are mounted to the AGV 51 (hereinafter also referred to as a mounting order of components 60) is an order of components 61, 62 and 63.

When the determination means 20 determines that the AGV 51 is included in the image acquired by the image acquisition means 10, it determines that the components 60 that should be mounted to the AGV 51 are the components 61, 62 and 63. Further, the determination means 20 may determine that the mounting order of a plurality of components 60 to the AGV 51 is an order of components 61, 62 and 63.

The image projection means 30 projects projection images indicating the components 60 determined to be mounted to the AGV 50. For example, the image projection means 30 projects, on each of the components 60 determined to be mounted to the AGV 50, a projection image indicating that the component should be mounted to the AGV 50. The image projection means 30 is, for example, a projector. Note that the image projection means 30 is not limited to projectors, but may be an information processing apparatus or a mobile device, such as a PC, a smartphone, and a tablet-type computer, as long as it has a function of projecting, on each of the components 60 determined to be mounted to the AGV 50, a projection image indicating that the component should be mounted to the AGV 50. Further, the image projection means 30 may include an output unit that outputs a signal or the like to an illumination apparatus in order to perform illumination control, such as control as to the type of illumination and the position thereof. In this case, the illumination apparatus may be an externally-provided product such as an IOT (Internet of Things) light connected to the Internet. The output unit may be connected to such an illumination apparatus and make (i.e., instruct) the illumination apparatus project projection images. Therefore, the image projection means 30 includes the output unit, and the output unit makes, by outputting a signal for illumination control, the illumination apparatus, which is an externally-provided product, project projection images indicating the components 60 determined to be mounted to the AGV 50.

The image projection means 30 is disposed, for example, on the ceiling of the work space 100 and is fixed so as to face downward. In this way, it is possible to project images on components 60 while eliminating any blind spots. Note that the image projection means 30 is not limited to those disposed on the ceiling of the work space 100, but may be disposed in any place in the work space 100, such as on the side (e.g., the wall surface) thereof or outside the work space 100 as long as the image projection means 30 can project images on components 60. The image projection means 30 may be disposed in the same position as that of the image acquisition means 10. The image projection means 30, in embodiments, projects projection images with light having brightness in the order of 10,000 lumens.

The image projection means 30 may project projection images indicating the mounting order of a plurality of components 60. Specifically, the image projection means 30 may project projection images indicating the mounting order of a plurality of components 60 on the plurality of components 60. For example, the image projection means 30 may project projection images indicating "1", "2" and "3" on the components 61, 62 and 63, respectively, in order to indicate that the mounting order is an order of components 61, 62 and 63.

As described above, the information output system 1 recognizes the AGV 50, the plurality of components 60, and the worker 70 in the work space 100 such as a production line, and instructs the worker 70 to mount components 60 by projecting projection images such as projection mapping. The worker 70 moves in the work space 100 and mounts components 60 to the AGV 50. A path along which the worker 70 moves in the work space 100 when he/she mounts a component 60 to the AGV 50 is called a flow line 80.

Figure 3:
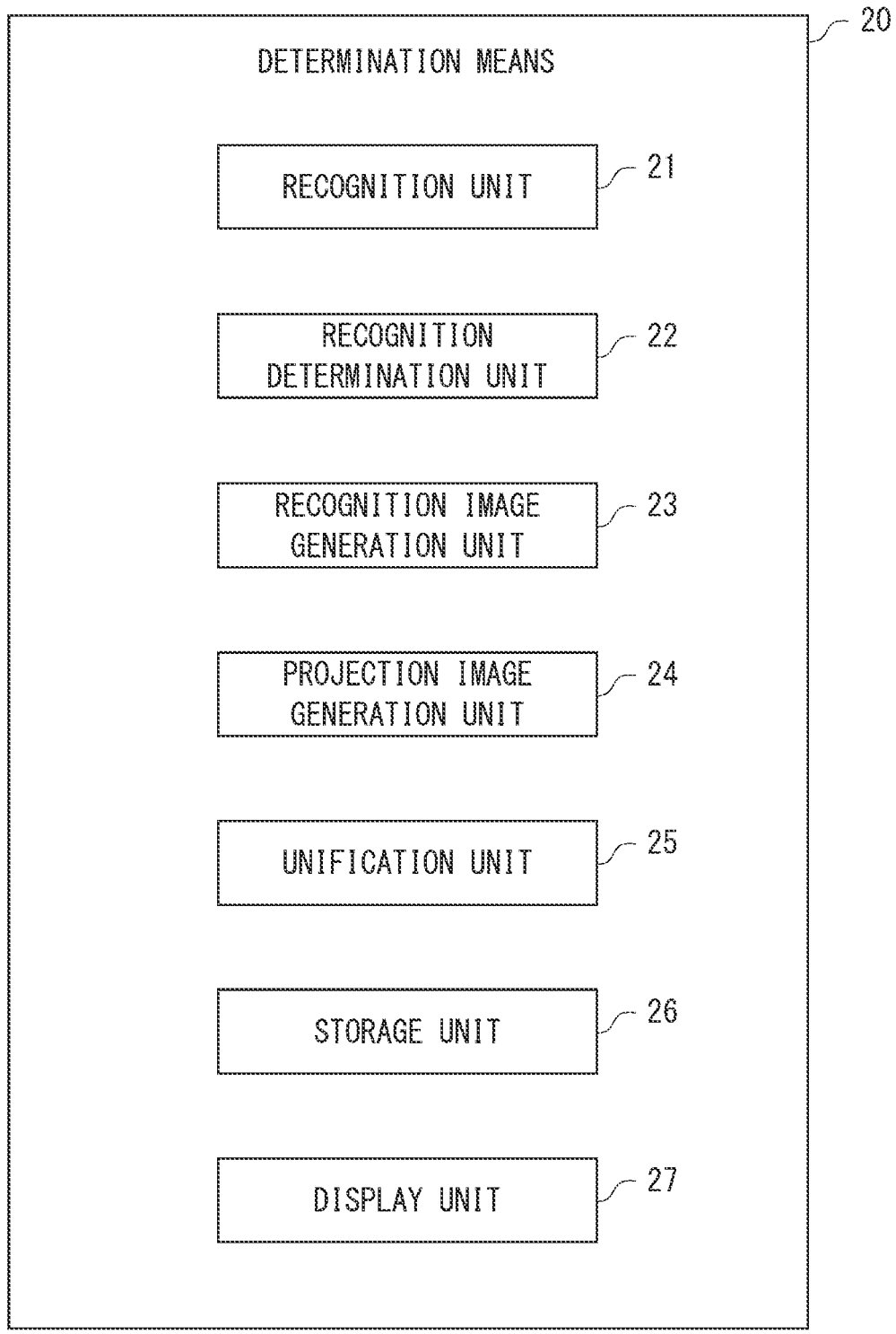
FIG. 3 is a block diagram showing an example of the determination means in the information output system according to the first embodiment.

FIG. 3 is a block diagram showing an example of the determination means 20 in the information output system 1 according to the first embodiment. As shown in FIG. 3, the determination means 20 includes a recognition unit 21, a recognition determination unit 22, a recognition image generation unit 23, a projection image generation unit 24, and a unification unit 25. Note that the determination means 20 may further include a storage unit 26 and a display unit 27. The recognition unit 21, the recognition determination unit 22, the recognition image generation unit 23, the projection image generation unit 24, the unification unit 25, the storage unit 26, and the display unit 27 function as recognition means, recognition determination means, recognition image generation means, display generation means, unification means, storage means, and display means, respectively.

Figure 4:
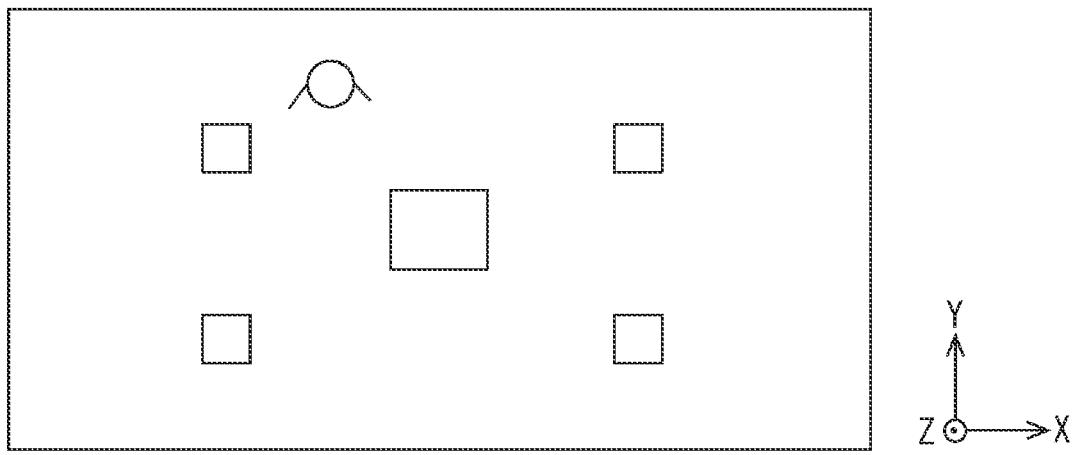
FIG. 4 shows an example of an image acquired by a recognition unit in the information output system according to the first embodiment.

The recognition unit 21 acquires an image from the image acquisition means 10. FIG. 4 shows an example of an image acquired by the recognition unit 21 in the information output system 1 according to the first embodiment. As shown in FIG. 4, the recognition unit 21 recognizes necessary objects and persons within the range shown in the acquired image. Specifically, the recognition unit 21 recognizes an AGV 50, a plurality of components 60, a worker 70 and the like shown in the acquired image. The recognition unit 21 outputs the image of the recognized AGV 50, the plurality of components 60, and the worker 70 to the recognition determination unit 22.

The recognition determination unit 22 determines what kinds of objects, persons, and the like have been recognized by the recognition unit 21 and are shown in the image input from the recognition unit 21. Specifically, the recognition determination unit 22 determines whether the image input from the recognition unit 21 includes information of an AGV 50, a plurality of components 60, and a worker 70. The recognition determination unit 22 determines, for example, whether the image includes information of an AGV 50, a plurality of components 60, and a worker 70 based on the positions, shapes, colors, and movements of objects shown in the image. Note that the recognition determination unit 22 may determine whether the image include information of an AGV 50, a plurality of components 60, and a worker 70 by using tags such as QR codes (Registered trademark) attached to (e.g., printed on) objects shown in the image.

Figure 5:
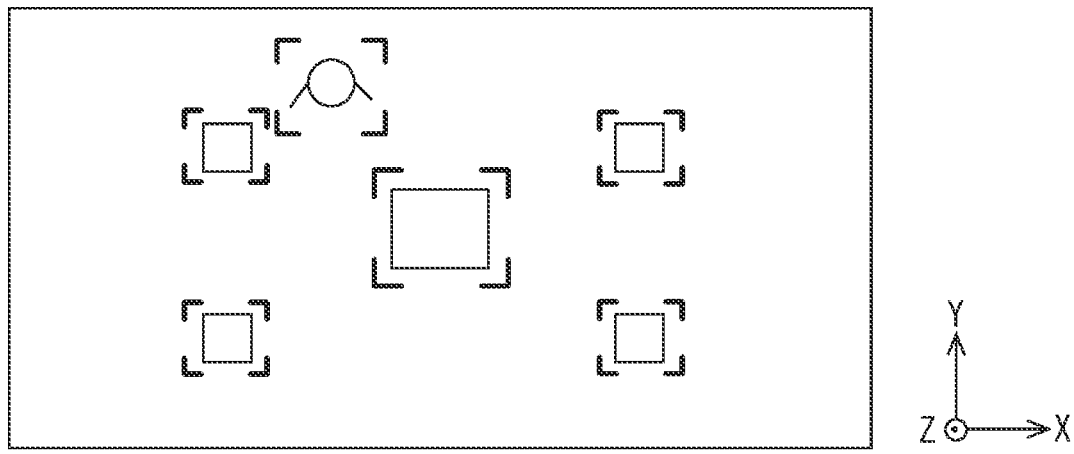
FIG. 5 shows an example of an image in which objects are determined by a recognition determination unit in the information output system according to the first embodiment.

FIG. 5 shows an example of an image in which objects have been determined by the recognition determination unit 22 in the information output system 1 according to the first embodiment. As shown in FIG. 5, when the recognition determination unit 22 determines that the image input from the recognition unit 21 contains information of an AGV 50, a plurality of components 60, and a worker 70, it determines whether the AGV 50, the plurality of components 60, and the worker 70 match an AGV 50, a plurality of components 60, and a worker 70 stored in the storage unit 26. The recognition determination unit 22 may determine, for example, whether they match an AGV 50, a plurality of components 60, and a worker 70 stored in the storage unit 26 based on the positions, shapes, colors, movements, tags, and the like of objects shown in the image.

When the AGV 50 shown in the input image matches an AGV 50 stored in the storage unit 26, the recognition determination unit 22 determines whether there are components 60 to be mounted to the AGV 50 in the input image based on the AGV 50, which has matched one stored in the storage unit 26. When the recognition determination unit 22 determines that there are components 60 to be mounted to the AGV 50 in the image input from the recognition unit 21, it outputs information of the components 60 to be mounted to the AGV 50 to the recognition image generation unit 23 and the projection image generation unit 24.

Figure 6:
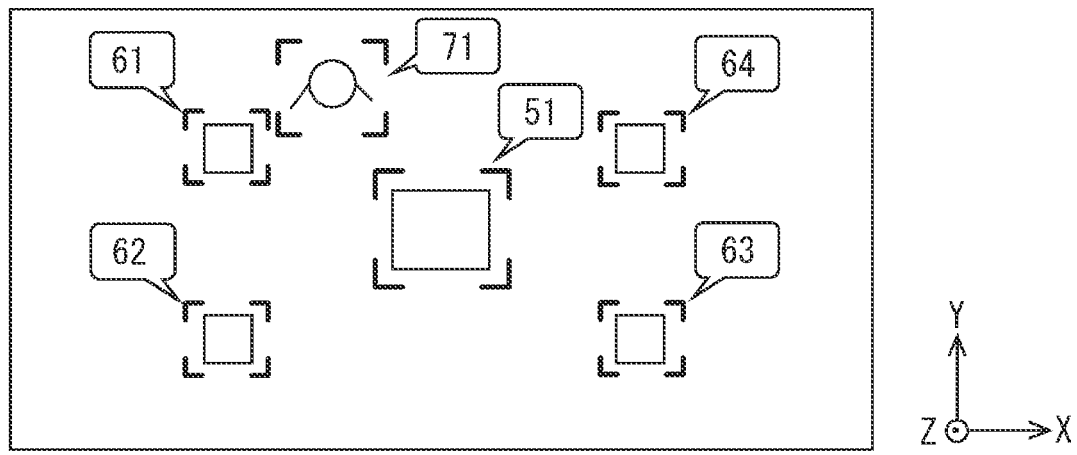
FIG. 6 shows an example of a recognition image generated by a recognition image generation unit in the information output system according to the first embodiment.

The recognition image generation unit 23 generates a recognition image in which labels are attached to the AGV 50, the plurality of components 60, and the worker 70 output from the recognition determination unit 22. FIG. 6 shows an example of the recognition image generated by the recognition image generation unit 23 in the information output system 1 according to the first embodiment. As shown in FIG. 6, the recognition image generation unit 23 attaches a label "51" representing an AGV 51 to the AGV 50 shown in the image recognized by the recognition unit 21. The recognition image generation unit 23 attaches labels "61", "62", "63" and "64" representing components 61, 62, 63 and 64, respectively, to the plurality of components 60 shown in the image recognized by the recognition unit 21. The recognition image generation unit 23 attaches a label "71" representing a worker 71 to the worker 70 shown in the image recognized by the recognition unit 21. In this way, the recognition image generation unit 23 generates the recognition image in which labels are attached to the AGV 50, the plurality of components 60, and the worker 70. The recognition image generation unit 23 may make (i.e., instruct) the display unit 27 display the generated recognition image. The recognition image generation unit 23 outputs the generated recognition image to the unification unit 25.

Figure 7:
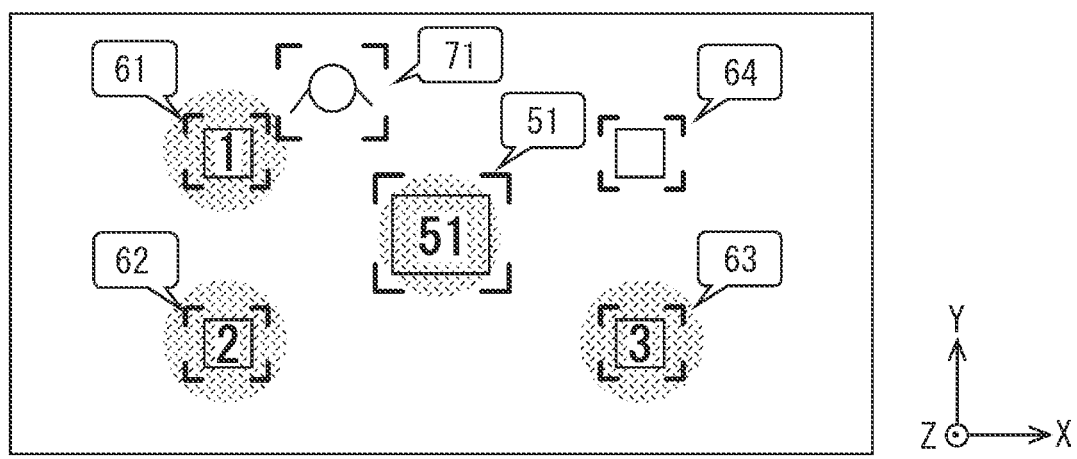
FIG. 7 shows an example of projection images generated by a projected image generation unit in the information output system according to the first embodiment.

The projection image generation unit 24 generates projection images to be projected on the components 60 that the recognition determination unit 22 has determined should be mounted to the AGV 50. FIG. 7 shows an example of projection images generated by the projection image generation unit 24 in the information output system 1 according to the first embodiment. As shown in FIG. 7, the projection image generation unit 24 generates (i.e., displays), for example, projection images indicating a mounting order "1", "2", "3", etc. in circular spots as projection images projected on the components 60 that have been determined to be mounted to the AGV 50. Note that in FIG. 7, the projection images are displayed on the recognition image in a unified and superimposed manner. The projection image generation unit 24 outputs the generated projection images to the unification unit 25.

Figure 8:
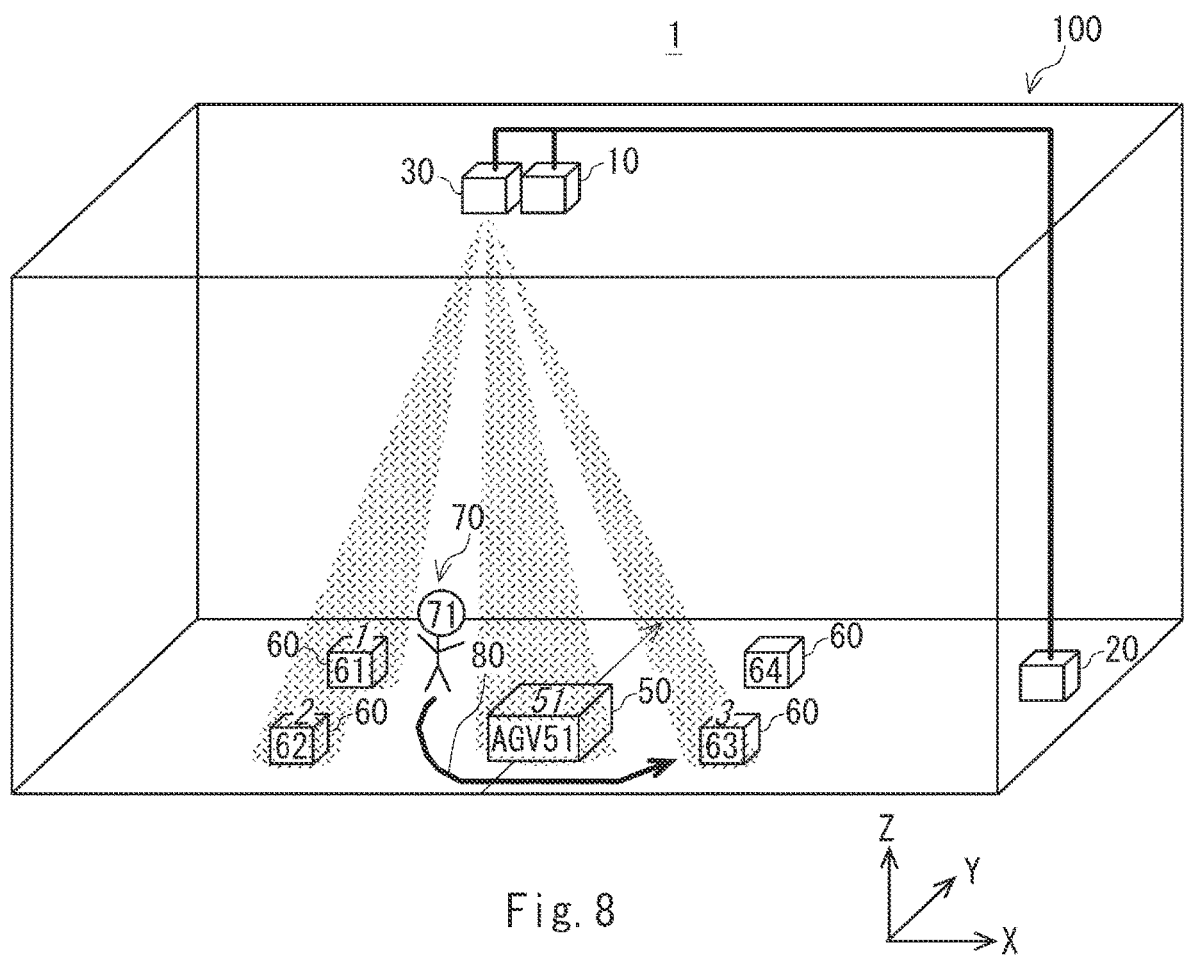
FIG. 8 shows an example of projection images projected by image projection means in the information output system according to the first embodiment.

As shown in FIG. 7, the unification unit 25 unifies the projection images generated by the projection image generation unit 24 with the recognition image generated by the recognition image generation unit 23. In this way, the unification unit 25 associates the projection images with the positions of the components 60 and the like recognized in the recognition image. Further, the information output system 1 can make the display unit 27 display the projection images on the components 60 to be mounted to the AGV 50. Further, the projection image generation unit 24 or the unification unit 25 outputs the projection images to the image projection means 30. FIG. 8 shows an example of projection images projected by the image projection means 30 in the information output system 1 according to the first embodiment. As shown in FIG. 8, the image projection means 30 projects projection images on a plurality of components 60 to be mounted to the AGV 50.

Figure 9:
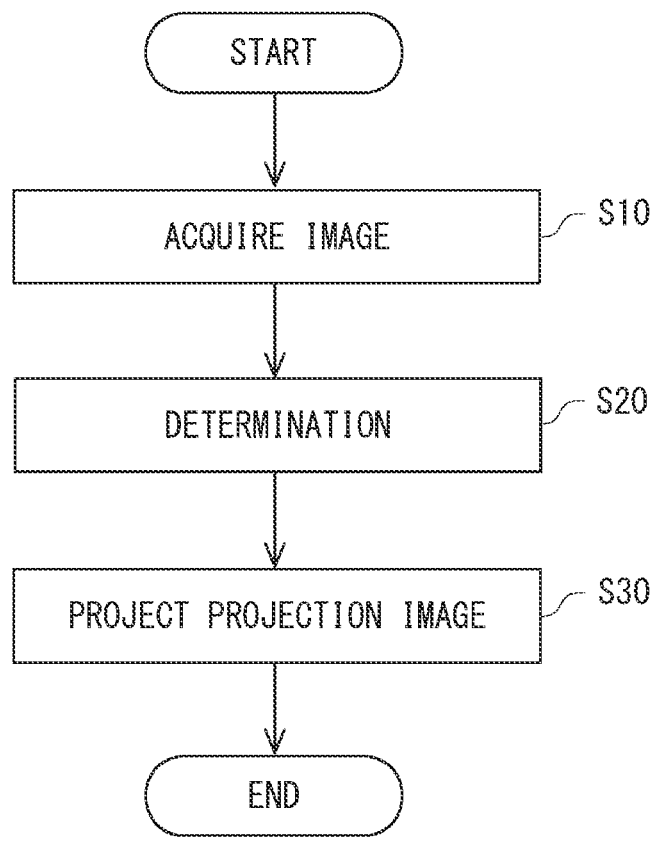
FIG. 9 is a flowchart showing an example of an information output method according to the first embodiment.

Next, an information output method according to this embodiment will be described. FIG. 9 is a flowchart showing an example of an information output method according to the first embodiment. As shown in a step S10 in FIG. 9, an image is acquired. Specifically, for example, the image acquisition means 10 acquires an image of the work space 100 including an AGV 50, a plurality of components 60, and at least one worker 70. The determination means 20 makes (i.e., instructs) the recognition unit 21 acquire the image of the work space 100 from the image acquisition means 10.

Next, as shown in a step S20, components and the like are determined in the acquired image. Specifically, the determination means 20 makes the recognition determination unit 22 determine components 60 to be mounted to the AGV 50 based on the AGV 50 shown in the image. For example, the determination means 20 makes the storage unit 26 store an AGV 51 (i.e., a serial number of an AGV 51) and components 61 to 63 (i.e., serial numbers of components 60) to be mounted to the AGV 51 in advance while associating them with each other. Then, when the recognition determination unit 22 determines that the AGV 51 is included in the acquired image, it determines that the components 60 to be mounted to the AGV 51 are the components 61, 62 and 63.

Note that the storage unit 26 may store information indicating that the mounting order of the plurality of components 60 to be mounted to the AGV 51 is an order of components 61, 62 and 63. In this case, the recognition determination unit 22 may determine that the mounting order of the plurality of components 60 to be mounted to the AGV 51 is an order of components 61, 62 and 63.

Next, as shown in a step S30, for each of the components 60 determined to be mounted to the AGV 50, a projection image indicating that the component should be mounted to the image projection means 30 is projected on the component. Specifically, the projection image generation unit 24 is made (i.e., instructed) to generate projection images. Then, for example, the image projection means 30 is made (i.e., instructed) to project projection images generated by the projection image generation unit 24 on the components 61, 62 and 63, which have been determined to be mounted to the AGV 51. The image projection means 30 is made (i.e., instructed) to project projection images indicating a mounting order on the plurality of components 60.

Figure 10:
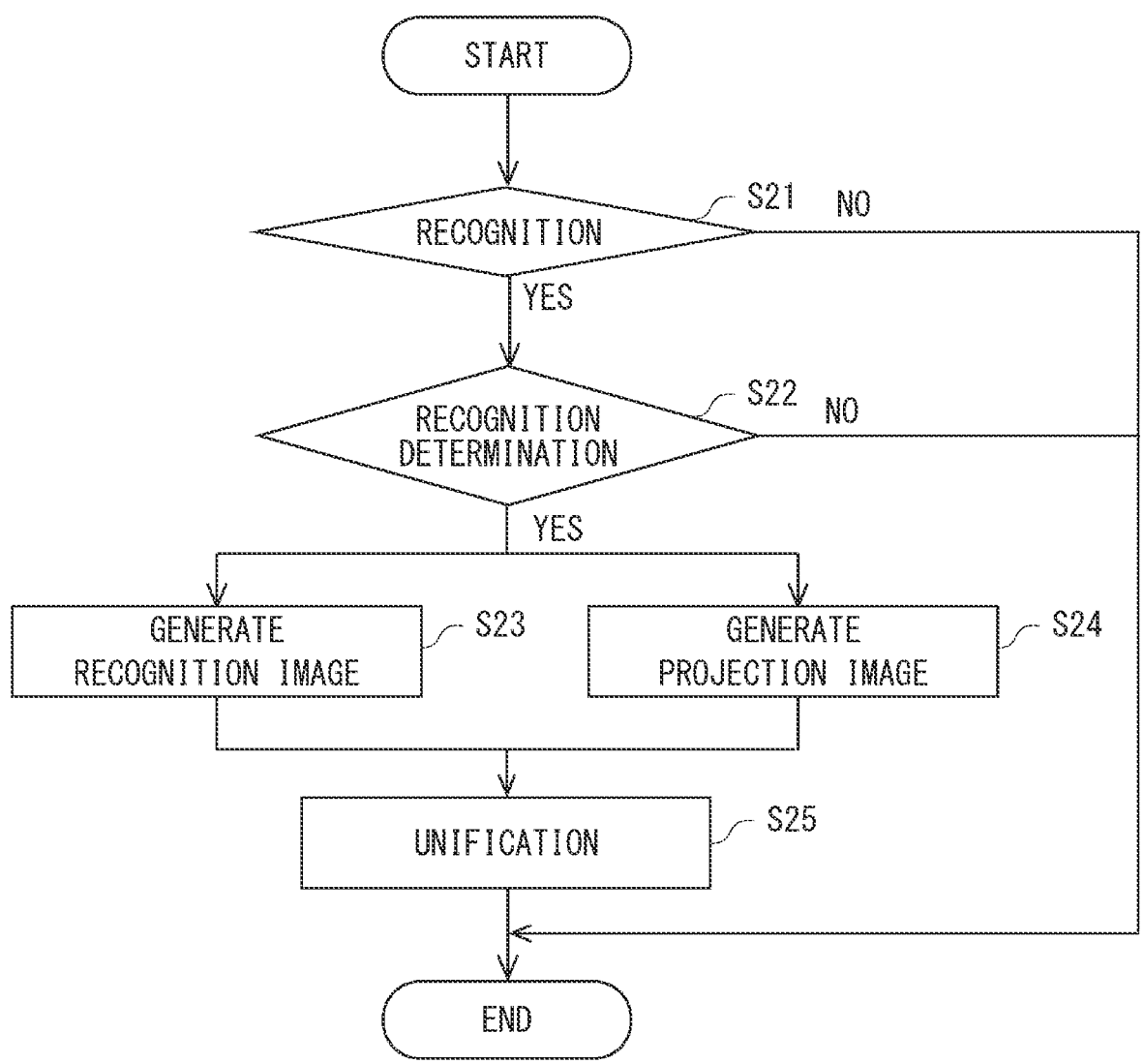
FIG. 10 is a flowchart showing an example of a method for determining a component to be mounted to an AGV in the information output method according to the first embodiment.

FIG. 10 is a flowchart showing an example of a method for determining components 60 to be mounted to an AGV 50 in the information output method according to the first embodiment. As shown in a step S21 in FIG. 10, the acquired image is recognized. Specifically, the recognition unit 21 recognizes an AGV 50, a plurality of components 60, a worker 70 and the like shown in the image acquired by the image acquisition means 10. When it is impossible to recognize an AGV 50, a plurality of components 60, a worker 70 and the like shown in the acquired image, i.e., when it is "No" in the step S21, the series of processes is finished. When an AGV 50, a plurality of components 60, a worker 70 and the like shown in the acquired image have been successfully recognized, i.e., when it is "Yes" in the step S21, the process proceeds to a step S22.

Next, as shown in a step S22, components and the like are determined in the recognition image. Specifically, the recognition determination unit 22 determines whether the image input from the recognition unit 21 contains information of an AGV 50, a plurality of components 60, and a worker 70. When the recognition determination unit 22 has determined that the image input from the recognition unit 21 contains information of an AGV 50, a plurality of components 60, and a worker 70, it determines whether the AGV 50, the plurality of components 60, and the worker 70 match an AGV 50, a plurality of components 60, and a worker 70 stored in the storage unit 26. When the AGV 50 shown in the input image matches an AGV 50 stored in the storage unit 26, the recognition determination unit 22 determines whether there are components 60 to be mounted to the AGV 50 in the image based on the AGV 50, which has matched one stored in the storage unit 26. When there are components 60 to be mounted to the AGV 50 in the image input from the recognition unit 21, i.e., when it is "Yes", the recognition determination unit 22 outputs information of the components 60 to be mounted to the AGV 50 to the recognition image generation unit 23 and the projection image generation unit 24. Then, the process proceeds to steps S23 and S24.

On the other hand, when the image input from the recognition unit 21 does not contain information of an AGV 50, a plurality of components 60, and a worker 70, i.e., when it is "No"; when the image input from the recognition unit 21 contains information of an AGV 50, a plurality of components 60, and a worker 70, but the AGV 50, the plurality of components 60, and the worker 70 do not match an AGV 50, a plurality of components 60, and a worker 70 stored in the storage unit 26, i.e., when it is "No"; or when there is no component 60 to be mounted to the AGV 50 in the image input from the recognition unit 21, i.e., when it is "No", the process is finished.

Next, as shown in a step S23, a recognition image is generated. Specifically, the recognition image generation unit 23 generates a recognition image in which labels are attached to the AGV 50, the plurality of components 60, and the worker 70 output from the recognition determination unit 22.

Further, as shown in a step S24, projection images are generated. Specifically, the projection image generation unit 24 generates, for each of the positions of components 60 that the recognition determination unit 22 has determined should be mounted to the AGV 50, a projection image to be projected on the position of the component 60.

Next, as shown in a step S25, the recognition image and the projection images are unified. In this way, the projection images are associated with the positions of the components 60 and the like recognized in the recognition image. Then, the unification unit 25 or the projection image generation unit 24 outputs the projection images corresponding to the positions of the components 60 and the like recognized in the recognition image to the image projection means 30. In this way, the image projection means 30 can output information.

Next, advantageous effects of this embodiment will be explained. The information output system 1 according to this embodiment acquires an image of the work space 100 including an AGV 50, a plurality of components 60, and a worker 70 in real time by using the image acquisition means 10. Therefore, it is possible to find the positions of components 60 to be mounted in real time even when the components 60 to be mounted are changed and/or the layout of the positions of components 60 is changed. Therefore, it is possible to appropriately project projection images on components 60 to be mounted to the AGV 50. Therefore, the worker 70 can mount appropriate components 60 to the AGV 50. The worker 70 does not need to check a leaflet or the like in which instructions are stated, can reduce errors in work, and can shorten the period for learning work.

The information output system 1 according to this embodiment can be installed by one installation work in which the image acquisition means 10 such as a camera and the image projection means 30 such as a projector are installed. Therefore, it is possible to cope with changes in components 60 to be mounted and/or changes in the layout of the positions of components 60 without requiring new installation work. In contrast, a method in which lamps for displaying a mounting order of components 60 are provided in a component rack in which components 60 are mounted requires new installation work to install lamps, wiring lines, and the like when the components 60 to be mounted are changed or the layout of the positions of components 60 is changed. As described above, the information output system 1 according to the embodiment eliminates the need for new installation work and hence can improve the productivity.

In a process that involves cell production in which changes in the number of products to be assembled, changes of workers 70, changes in product types, malfunctions, and the like occur, the tact time (a process work time to ensure equivalent timings in the production process) is longer than that of a normal line. Therefore, a situation in which it is difficult to know which work to do next occurs. Further, depending on the operating status of the facility (including an AGV and the like) or the status of cooperating workers 70, a waiting time may occur.

According to the information output system 1 in accordance with this embodiment, in a work space 100 for such a production process, it is possible to indicate a procedure for each worker 70 who is suitable to a situation by using the image projection means 30 based on the result of recognition by the image acquisition means 10 such as a camera that monitors the overall situation in an overlooking manner and the determination means 20. Therefore, it is possible to reduce additional work, such as pressing a special button, that a worker 70 would otherwise need to perform, and hence to improve the productivity.

Second Embodiment

Figure 11:
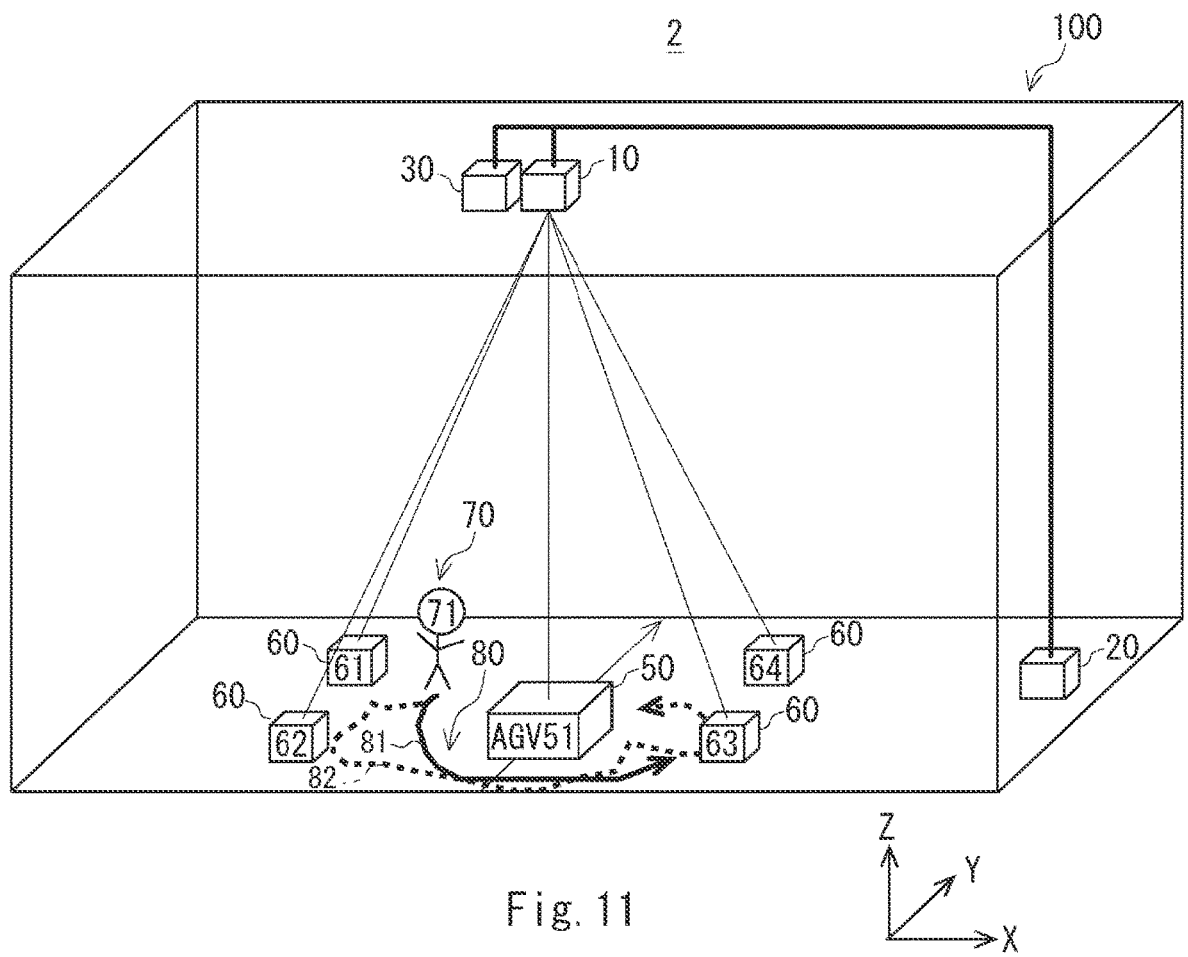
FIG. 11 is a schematic diagram showing an example of an information output system according to a second embodiment.

Next, an information output system according to a second embodiment will be described. FIG. 11 is a schematic diagram showing an example of an information output system according to the second embodiment. As shown in FIG. 11, the information output system 2 according to this embodiment generates a layout of components 60 based on the analysis of flow lines 81 and 82 of a worker 70. Then, the information output system 2 outputs information about the generated layout.

Figure 12:
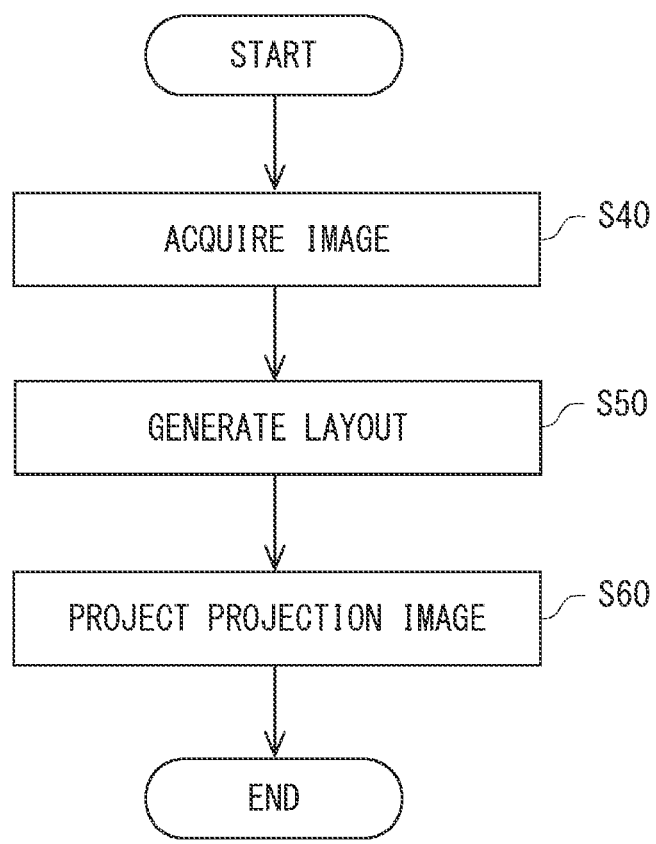
FIG. 12 is a flowchart showing an example of an information output method according to the second embodiment.

FIG. 12 is a flowchart showing an example of an information output method according to the second embodiment. As shown in a step S40 in FIG. 12, in the information output system 2 according to this embodiment, the image acquisition means 10 acquires an image of a flow line 80 of a worker 70 when a component 60 is mounted to an AGV 50. The flow line 80 is a trajectory along which the worker 70 has moved in the work space 100. The image acquisition means 10 may acquire images of a plurality of flow lines 80. The image acquisition means 10 may acquire an image of a flow line 81 along which a specific worker 71 has moved in the work space 100. Further, the image acquisition means 10 may acquire images of a plurality of flow lines 80 along which a plurality of different workers 70 have moved in the work space 100 when components 60 are mounted to the AGV 50. Note that as described above, the position information means is not limited to the image acquisition means 10, but may be performed (i.e., implemented) through the acquisition of position information based on information obtained by a sensor provided in a terminal carried by the worker 70 or through the acquisition of position information by other environmental sensors. In that case, the flow line of the worker 70 is not limited to those acquired by the image acquisition means 10, but may be acquired by a sensor of a terminal carried by the worker 70 or acquired by other environmental sensors. Further, even when the information acquired as described above is not directly analyzed from the image, there may be a case in which it is determined which position the information as described above should be output to in association with the acquired image.

Next, as shown in a step S50 in FIG. 12, the determination means 20 generates a layout in which a plurality of components 60 are disposed in the work space 100. To generate the layout, the determination means 20 stores flow lines 80 of a plurality of workers 70. After that, the determination means 20 generates the layout of the plurality of components 60 based on the analysis of the stored flow lines 80.

Figure 13:
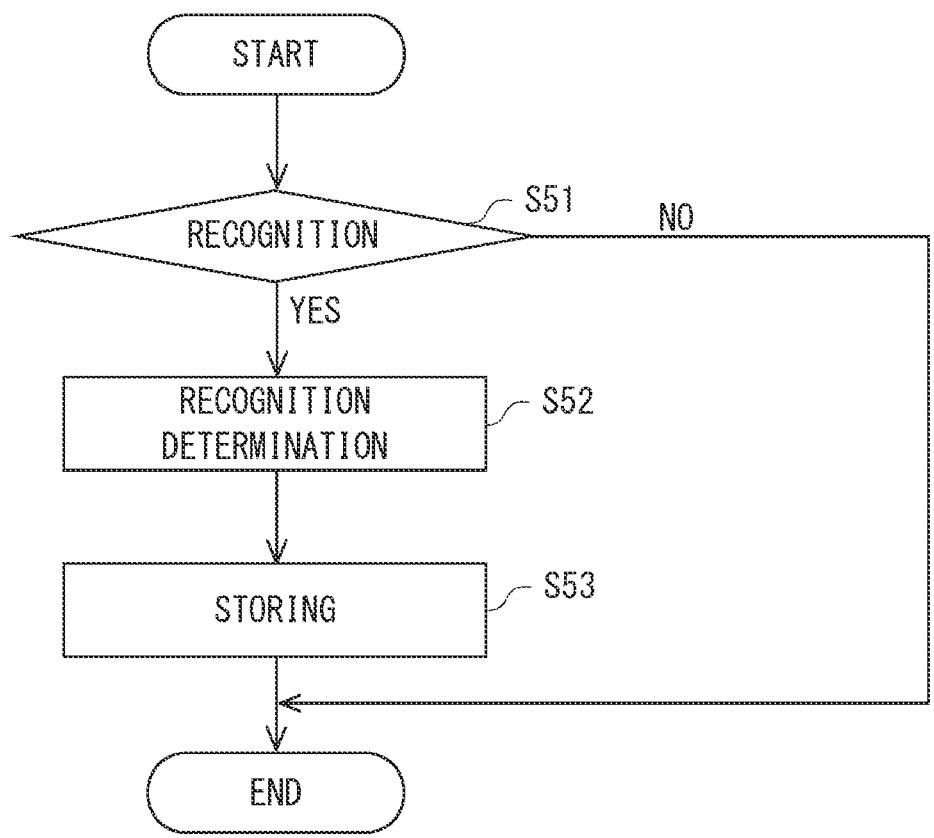
FIG. 13 is a flowchart showing an example of a method for storing information in the information output method according to the second embodiment.

FIG. 13 is a flowchart showing an example of a method for storing information in the information output method according to the second embodiment. As shown in a step S51 in FIG. 13, the recognition unit 21 recognizes an AGV 50, a plurality of components 60, a worker(s) 70, a flow line(s) 80, and the like shown in the image acquired by the image acquisition means 10. In the step S51, when an AGV 50, a plurality of components 60, a worker 70, a flow line 80, and the like cannot be recognized in the acquired image, i.e., when it is "No", the process is finished. In the step S51, when an AGV 50, a plurality of components 60, a worker 70, a flow line 80, and the like have been successfully recognized in the acquired image, i.e., when it is "Yes", the process proceeds to a step S52.

Next, as shown in a step S52, the recognition determination unit 22 determines whether the image input from the recognition unit 21 contains information of an AGV 50, a plurality of components 60, a worker 70, and a flow line 80. When the recognition determination unit 22 determines that the image input from the recognition unit 21 contains information of an AGV 50, a plurality of components 60, a worker 70, and a flow line 80, it determines whether the AGV 50 and the worker 70 match an AGV 50 and a worker 70 stored in the storage unit 26.

When the AGV 50 and the worker 70 shown in the input image match an AGV 50 and a worker 70 stored in the storage unit 26, the recognition determination unit 22 stores, as shown in a step S53, the flow line 80 while associating it with the AGV 50 and the worker 70 stored in the storage unit 26. On the other hand, when the AGV 50 and the worker 70 shown in the input image do not match an AGV 50 and a worker 70 stored in the storage unit 26, the recognition determination unit 22 newly adds the AGV 50 and the worker 70, and stores the flow line 80 while associating it with the newly-added AGV 50 and the worker 70.

Figures 14, 15:
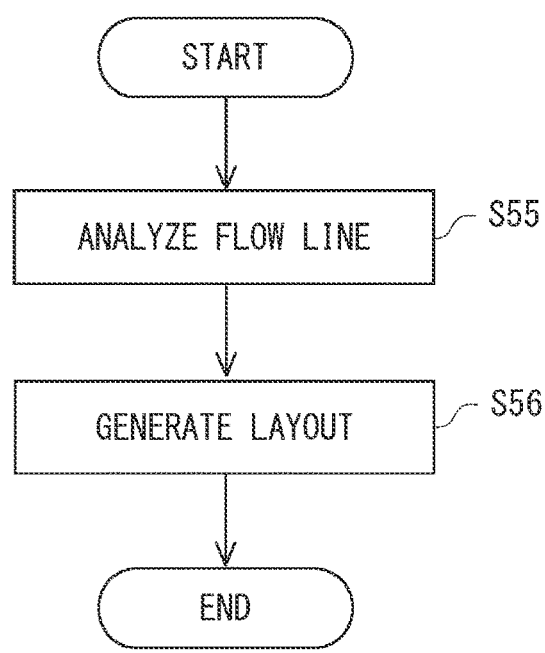
FIG. 14 shows an example of information stored in a storage unit in an information output system 2 according to the second embodiment.
FIG. 15 is a flowchart showing an example of a method for generating a layout in the information output method according to the second embodiment.

FIG. 14 shows an example of information stored in the storage unit 26 in the information output system 2 according to the second embodiment. As shown in FIG. 14, the storage unit 26 may store AGVs 50 (e.g., serial numbers of AGVs 50) and flow lines 80 of workers 70 for the AGVs 50. For example, the storage unit 26 may store AGVs 51 to 53 (i.e., their serial numbers) and flow lines 81 to 83 of workers 71 to 73 for the AGVs 51 to 53.

FIG. 15 is a flowchart showing an example of a method for generating a layout in the information output method according to the second embodiment. As shown in a step S55 in FIG. 15, the recognition determination unit 22 analyzes flow lines 81 to 83 of a plurality of different workers 71 to 73 for AGVs 51 to 53. Specifically, for example, the recognition determination unit 22 analyzes the lengths of the flow lines 81 to 83 of the workers 71 to 73 for the AGV 51, the vector of each of positions included in the flow lines 81 to 83, and the moving speeds and the like of the workers 71 to 73 Then, the recognition determination unit 22 generates a layout in the work space 100 based on the analyses of these flow lines 80.

For example, the recognition determination unit 22 compares a flow line 81 of a skilled worker 71 with a flow line 82 of a novice worker 72. The recognition determination unit 22 may display a difference between the flow line 81 of the skilled worker 71 and the flow line 82 of the novice worker 72 on the display unit 27. The recognition determination unit 22 may find a difference between the skilled worker 71 and the novice worker 72 in the flow lines 81 and 82 from a component 62 to a component 63. Specifically, the recognition determination unit 22 may find that a difference between flow lines 81 and 82 of a plurality of different workers 71 and 72 from a component 62 to a component 63 is larger than a difference between the flow lines 81 and 82 of the plurality of different workers 71 and 72 from a component 61 to the component 62. In that case, the recognition determination unit 22 may generate a layout in which the position of the component 63 is changed.

Figure 16:
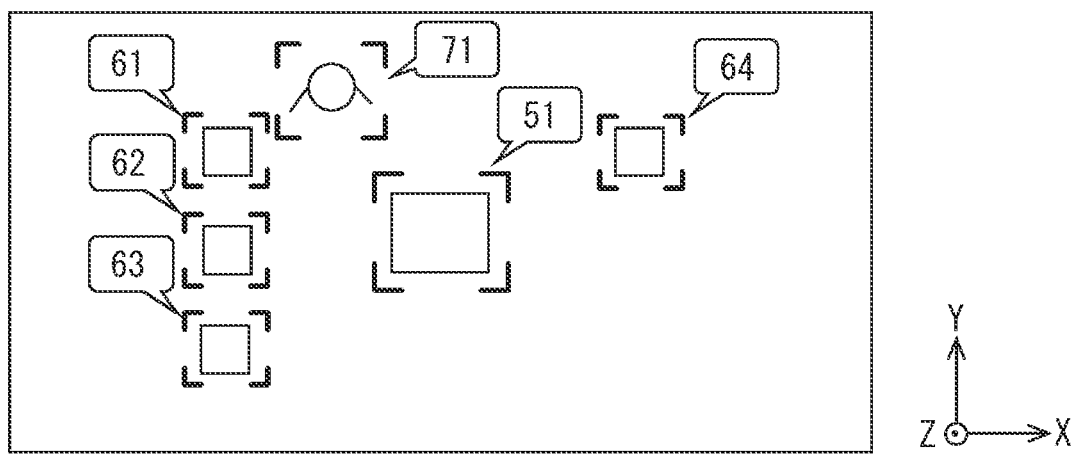
FIG. 16 shows an example of a layout generated by a recognition determination unit in the information processing method according to the second embodiment.

FIG. 16 shows an example of a layout generated by the recognition determination unit 22 in the information processing method according to the second embodiment. As shown in FIG. 16, the recognition determination unit 22 may generate a layout in which, in order to reduce the difference between the flow lines 81 and 82 from the component 62 to the component 63, the position of the component 63 is moved closer to the component 62 so that the flow line 80 from the component 62 to the component 63 is shortened. As described above, the recognition determination unit 22 generates the layout in which the component 63 is disposed so that the part of the flow lines 81 and 82 of the plurality of different worker 71 and 72 where a difference therebetween is large is shortened. In this way, as shown in a step S56 in FIG. 15, the recognition determination unit 22 generates the layout in which the position of the component 60 in the work space 100 is changed based on the analysis of the flow lines 80.

Figure 17:
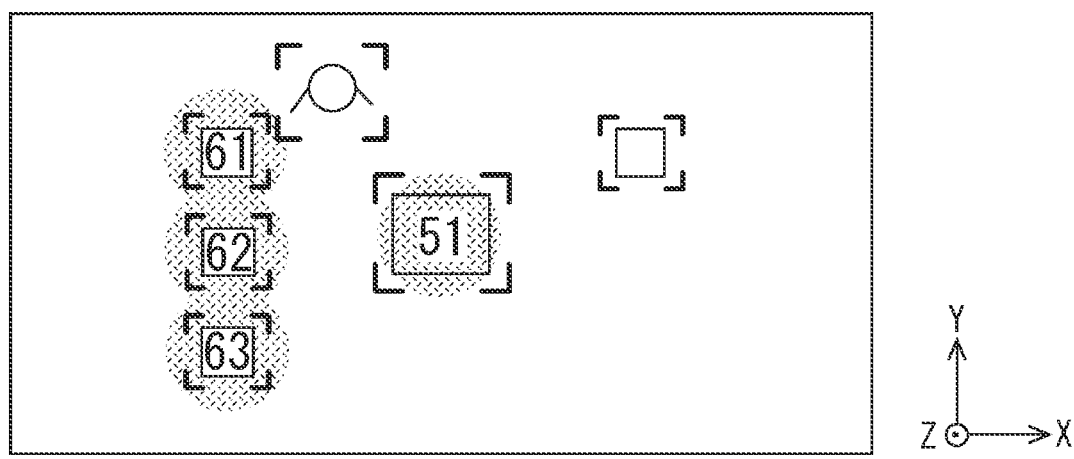
FIG. 17 shows an example of projection images generated by a projection image generation unit in the information output method according to the second embodiment.

The recognition determination unit 22 outputs the generated layout to the projection image generation unit 24. The projection image generation unit 24 generates projection images to be projected in the work space 100. FIG. 17 shows an example of projection images generated by the projection image generation unit 24 in the information output method according to the second embodiment. As shown in FIG. 17, the projection image generation unit 24 generates, for each of the positions of components 60 which have been changed in the generated layout, a projection image indicating the position of the component 60 on the position of the component 60. For example, in the generated layout, the changed position of the component 63 is a position that is aligned with the component 62 in the Y-axis direction and is located on the negative side thereof. Therefore, the projection image generation unit 24 generates, for the position that is aligned with the component 62 in the Y-axis direction and is located on the negative side thereof, i.e., for the position of the changed component 63, a projection image "63" so as to indicate that this position is the position of the component 63. The projection image generation unit 24 outputs the projection images indicating the positions of components 60 to the image projection means 30.

Figure 18:
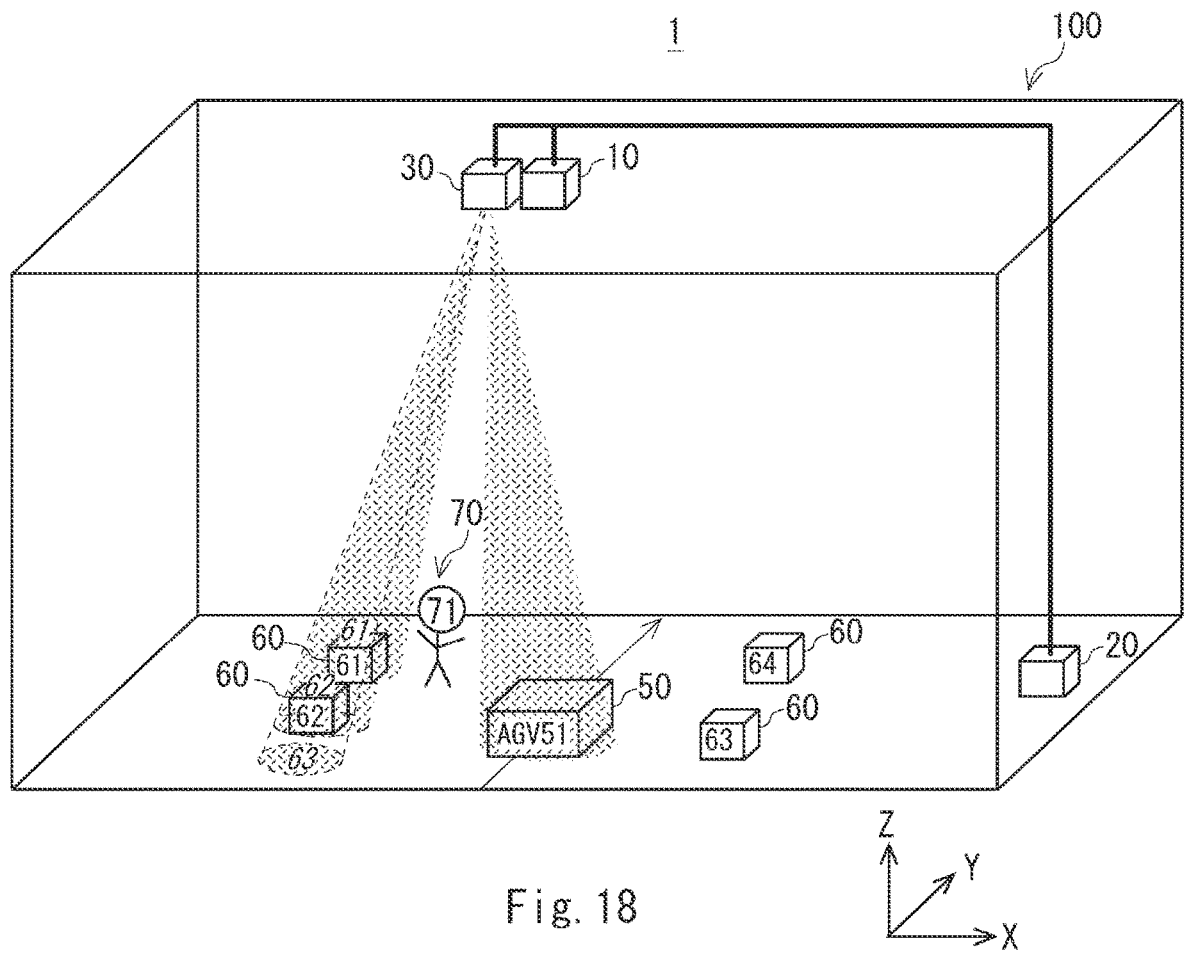
FIG. 18 shows an example of projection images projected by image projection means in the information output method according to the second embodiment.

Next, as shown in a step S60 in FIG. 12, the image projection means 30 projects the projection images indicating the changed positions of the components 60 in the generated layout. Specifically, the image projection means 30 projects, for each of the changed positions of the components 60 in the generated layout, a projection image indicating the position of the component 60 on the position of the component 60. FIG. 18 shows an example of projection images projected by the image projection means in the information output method according to the second embodiment. As shown in FIG. 18, the image projection means 30 projects a projection image "63" indicating the changed position of the component 63 in the generated layout on the position of the component 63. Note that the position on which the image projection means 30 projects a projection image is not limited to the position of the component 60 itself. For example, in the case where a projection image cannot be projected because the projection makes the position obscure, or in the case where a projection image can be projected, but there are no objects and no irregularities on a part of the floor located in front of the position of the component so that the projection image can be projected more clearly on that part of the floor, so that the projection image is not directly projected on the changed position of the component 60, an arrow-like projection image that is positioned near the changed position of the component 60 and points the position of the changed object may be projected, or text or the like related to the changed position of the component 60 may be projected. As described above, the image projection means 30 may output a projection image associated with the changed position of the component 60.

Next, advantageous effects of this embodiment will be explained. The information output system 2 according to this embodiment generates a layout of components 60 and the like in the work space 100 based on the analysis of a flow line(s) 80 of a worker(s) 70. For example, the determination means 20 generates the layout in which components 60 are disposed so that the part of flow lines 80 of a plurality of different workers 70 where a difference therebetween is large is shortened. In this way, it is possible to reduce a difference between work performed by a skilled worker 71 and that performed by a novice worker 72, and makes their work equivalent to each other. Further, it is possible to indicate, to a worker 70, an assembling order of components 60 with a minimum distance along which he/she moves, and thereby to shorten the work time and the period that is required for learning work. Other configurations and advantageous effects are already described in the description of the first embodiment.

Note that the present disclosure is not limited to the above-described embodiments, and they can be modified as appropriate without departing from the scope and spirit of the disclosure. For example, the function of the image projection means 30 is not limited to projecting projection images (first reference projection images) indicating components 60 that have been determined to be mounted to the AGV 50. The image projection means 30 may project a projection image (a second reference projection image) for one component 60, containing information for helping the worker understand which of AGVs 50, which come to the work space 100 and go out therefrom in turn over time, the component should be mounted to. Further, the AGV 50 may include, for example, an installation structure that enables components 60 to be disposed in a plurality of different places in a shelf or the like. In this case, the image projection means 30 may project a projection image (a third reference projection image) for one component 60, containing information for helping the worker understand which of places in the installation structure the component should be disposed in.

The function of the determination means 20 is not limited to determining components 60 to be mounted to the AGV 50 based on the AGV 50 (the first mobile object information) shown in the acquired image. In addition to the case where components 60 are determined based on the AGV 50 shown in the image acquired by the image acquisition means 10, the determination means 20 may determine components 60 even when the AGV 50 is not shown in the image, i.e., even when the AGV 50 has not appeared in the work space 100 yet. For example, examples of information other than the image include information about AGVs 50 by which it is possible to know which AGV 50 will appear in the work space 100 and when the AGV 50 will appear based on an operation schedule of AGVs 50, and information about AGVs 50 by which it is possible to know the position and state of a distant AGV 50 through communication from the AGV 50. Therefore, the determination means 20 may determine components 60 to be mounted to the AGV 50 based on information indicating the time when the AGV 50 will appear in the work space 100 (second mobile object information) and information indicating the position in which the AGV 50 is located before the AGV 50 appears in the work space 100 (third mobile object information). In this way, the information output system may perform, for example, projection at appropriate timing and appropriate position with appropriate settings and the like based on the information of the determined components 60 according to the position and state of the AGV 50 which has entered the image of the work space 100.

Further, the image acquisition means 10 may acquire a flow line 80 along which a worker 70 moves in the work space 100 when s component 60 is mounted to the AGV 50, but the operation of the image acquisition means 10 is not limited to this example. The acquisition of a flow line 80 may be performed by another entity that receives image information from the image acquisition means 10. Therefore, the determination means 20 may analyze a flow line 80 that is acquired by means other than the image acquisition means 10. For example, the determination means 20 may obtain a flow line by having an arithmetic unit provided separately from the determination means 20 analyze (track) the position of the AGV 50 in each of a plurality of acquired time-series images. Note that regarding the image acquisition means 10, the timing when a flow line 80 is acquired is not limited to the timing when a component 60 is mounted to the AGV 50. That is, the timing when a component 60 is mounted to the AGV 50 does not necessarily have to be used as a trigger for starting the mounting.

Any configuration or the like that is obtained by combining the configurations of the first and second embodiments is also included within the scope of the technical concept of the embodiments. Further, an information output program that causes a computer to perform an information output method according to an embodiment is also included in the scope of the technical concept of the embodiment.

The determination means 20 according to this embodiment may be an information processing apparatus such as a PC and a server as described above. The information processing apparatus may include a processor, a memory, and a storage device. The storage device may store, for each of the components of the determination means 20, a program for processes performed by the component. Further, the processor may load a program from the storage device onto the memory and execute the loaded program. In this way, the processor implements the function of each of the components in the determination means 20. The information processing apparatus may implement the determination means 20 shown in FIG. 3 by having the processor execute programs corresponding to the recognition unit 21, the recognition determination unit 22, the recognition image generation unit 23, the projection image generation unit 24, the unification unit 25 and the like while referring to (i.e., reading/writing data or the like from/to) the memory and the storage device.

Each of the components included in the determination means 20 may be implemented by dedicated hardware. Further, some or all of the components may be implemented by, for example, a general purpose or dedicated circuit (Circuitry), a processor, or a combination thereof. These components may be formed by a single chip or a plurality of chips connected to each other through a bus. Some or all of the components may be implemented by any combination of the above-described circuits and programs. Further, as the processor PRC, a CPU (Central Processing Unit), a GPU (Graphics Processing Unit), an FPGA (Field-programmable Gate Array), a quantum processor (quantum computer control chip) or the like can be used.

Further, when some or all of the components of the determination means 20 are implemented by a plurality of information processing apparatuses, circuits, or the like, the plurality of information processing apparatuses, circuits, or the like may be centralized in one place or distributed over a plurality of places. For example, the information processing apparatuses, circuits, or the like may be implemented by a client-server system, a cloud computing system, or the like in a form in which the apparatuses or the like are connected to each other through a communication network(s). Further, the function of the determination means 20 may be provided in a SaaS (Software as a Service) form.

The programs include instructions (or software codes) that, when loaded into the determination means 20 or the like including a computer, cause the computer to perform one or more of the functions described in the embodiments. The programs may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray (Registered Trademark) disc or other types of optical disc storage, and magnetic cassettes, magnetic tape, magnetic disk storage or other types of magnetic storage devices. The programs may be transmitted on a transitory computer readable medium or a communication medium. By way of example, and not a limitation, transitory computer readable media or communication media can include electrical, optical, acoustical, or other forms of propagated signals.

The following information output methods and information output programs are also included in the scope of the technical concept of the embodiments.

(Supplementary Note 1)

An information output method comprising:

acquiring an image of a work space including a mobile object, a plurality of components, and at least one worker;

determining a component to be mounted to the mobile object based on at least one of first mobile object information indicating the mobile object in the acquired image, second mobile object information indicating a time when the mobile object appears in the work space, and third mobile object information indicating a position in which the mobile object is located before the mobile object appears in the work space;

projecting a projection image including at least one of a first reference projection image indicating the component determined to be mounted to the mobile object, a second reference projection image indicating which of mobile objects appearing in the work space the component should be mounted to, and a third reference projection image indicating a housing position of the mobile object;

generating a layout in which a position of the component in the work space is changed based on an analysis of a flow line along which the worker moves in the work space; and projecting the projection image indicating the changed position of the component in the layout.

(Supplementary Note 2)

The information output method described in Supplementary note 1, wherein when the components to be mounted to the mobile object are determined, an order according to which the plurality of components are mounted to the mobile object is determined, and when a projection image indicating that components should be mounted is projected, a projection image indicating the order according to which the plurality of components are mounted to the mobile object is projected.

(Supplementary Note 3)

The information output method described in Supplementary note 2, wherein when the component is mounted to the mobile object, a plurality of flow lines along which a plurality of different workers move in the work space are acquired, and when the layout is generated, the layout in which the component is disposed so that a part of the flow lines of the plurality of different workers where a difference therebetween is large is shortened is generated.

(Supplementary Note 4)

The information output method described in Supplementary note 3, wherein when the layout is generated, the layout in which a position of a third component is changed when a difference between flow lines of the plurality of different workers from a second component to the third component is larger than that between flow lines of the plurality of different workers from a first component to the second component is generated.

(Supplementary Note 5)

An information output program for causing a computer to:

acquire, from image acquisition means, an image of a work space including a mobile object, a plurality of components, and at least one worker;

determine a component to be mounted to the mobile object based on at least one of first mobile object information indicating the mobile object in the acquired image, second mobile object information indicating a time when the mobile object appears in the work space, and third mobile object information indicating a position in which the mobile object is located before the mobile object appears in the work space;

make image projection means project a projection image including at least one of a first reference projection image indicating the component determined to be mounted to the mobile object, a second reference projection image indicating which of mobile objects appearing in the work space the component should be mounted to, and a third reference projection image indicating a housing position of the mobile object;

generate a layout in which a position of the component in the work space is changed based on an analysis of a flow line along which the worker moves in the work space; and make the image projection means project the projection image indicating the changed position of the component in the layout.

(Supplementary Note 6)

The information output program described in Supplementary note 5, wherein the information output program causes the computer to:

determine, when the components to be mounted to the mobile object are determined, an order according to which the plurality of components are mounted to the mobile object; and project, when a projection image indicating that components should be mounted is projected, a projection image indicating the order according to which the plurality of components are mounted to the mobile object.

(Supplementary Note 7)

The information output program described in Supplementary note 6, wherein the information output program causes the computer to:

acquire, when the component is mounted to the mobile object, a plurality of flow lines along which a plurality of different workers move in the work space; and generate, when the layout is generated, the layout in which the component is disposed so that a part of the flow lines of the plurality of different workers where a difference therebetween is large is shortened.

(Supplementary Note 8)

The information output program described in Supplementary note 7, wherein the information output program causes the computer to generate, when the layout is generated, the layout in which a position of a third component is changed when a difference between flow lines of the plurality of different workers from a second component to the third component is larger than that between flow lines of the plurality of different workers from a first component to the second component.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An information output system comprising:

a Power over Ethernet camera configured to acquire an image comprising a moving image of a work space including a mobile object comprising an automatic guide vehicle, a plurality of components, and at least one worker;

a processor configured to determine a component to be mounted to the mobile object based on at least one of first mobile object information indicating the mobile object in the acquired image, second mobile object information indicating a time when the mobile object appears in the work space, and third mobile object information indicating a position in which the mobile object is located before the mobile object appears in the work space; and a projector configured to project a first projection image including at least one of a first reference projection image indicating the component determined to be mounted to the mobile object, a second reference projection image indicating which of a plurality of mobile objects appearing in the work space the component should be mounted to, and a third reference projection image indicating a housing position of the mobile object, wherein the processor is configured to generate a layout in which a position of the component in the work space is changed based on an analysis of a flow line along which the worker moves in the work space, the projector is configured to project a second projection image indicating the changed position of the component in the layout, the processor is configured to determine an order according to which the plurality of components are mounted to the mobile object, the projector is configured to project a third projection image indicating the order according to which the plurality of components are mounted to the mobile object, the processor is configured to instruct the automatic guide vehicle to autonomously travel within the work space based on transmitting a control signal to the automatic guide vehicle, and the automatic guide vehicle is configured to autonomously travel within the work space in accordance with the instruction and in response to the control signal from the processor, and the processor is configured to determine whether the plurality of components are to be mounted to the mobile object by matching the mobile object in the acquired image that is autonomously traveling within the work space with a stored mobile object image in a storage.

2. The information output system according to claim 1, wherein when the component is mounted to the mobile object, the Power over Ethernet camera is configured to acquire a plurality of flow lines along which a plurality of different workers move in the work space, and the processor is configured to generate the layout in which the component is disposed so that a part of the plurality of flow lines of the plurality of different workers where a difference therebetween is large is shortened.

3. The information output system according to claim 2, wherein when a difference between the plurality of flow lines of the plurality of different workers from a second component to a third component is larger than that between the plurality of flow lines of the plurality of different workers from a first component to the second component, the processor is configured to generate the layout in which a position of the third component is changed.

4. An information output method comprising:

acquiring, by a Power over Ethernet camera, an image comprising a moving image of a work space including a mobile object comprising an automatic guide vehicle, a plurality of components, and at least one worker;

determining a component to be mounted to the mobile object based on at least one of first mobile object information indicating the mobile object in the acquired image, second mobile object information indicating a time when the mobile object appears in the work space, and third mobile object information indicating a position in which the mobile object is located before the mobile object appears in the work space;

projecting a first projection image including at least one of a first reference projection image indicating the component determined to be mounted to the mobile object, a second reference projection image indicating which of a plurality of mobile objects appearing in the work space the component should be mounted to, and a third reference projection image indicating a housing position of the mobile object;

generating a layout in which a position of the component in the work space is changed based on an analysis of a flow line along which the worker moves in the work space;

projecting a second projection image indicating the changed position of the component in the layout;

determining an order according to which the plurality of components are mounted to the mobile object, projecting a third projection image indicating the order according to which the plurality of components are mounted to the mobile object;

instructing the automatic guide vehicle to autonomously travel within the work space based on transmitting a control signal to the automatic guide vehicle, the automatic guide vehicle being configured to autonomously travel within the work space in accordance with the instruction and in response to the control signal from the processor, and determining whether the plurality of components are to be mounted to the mobile object by matching the mobile object in the acquired image that is autonomously traveling within the work space with a stored mobile object image in a storage.

5. The information output method according to claim 4, wherein when the component is mounted to the mobile object, a plurality of flow lines along which a plurality of different workers move in the work space are acquired, and when the layout is generated, the layout in which the component is disposed so that a part of the plurality of flow lines of the plurality of different workers where a difference therebetween is large is shortened is generated.

6. The information output method according to claim 5, wherein when the layout is generated, the layout in which a position of a third component is changed when a difference between the plurality of flow lines of the plurality of different workers from a second component to the third component is larger than that between the plurality of flow lines of the plurality of different workers from a first component to the second component is generated.

7. A non-transitory computer readable medium storing an information output program for causing a computer to:

acquire, from a Power over Ethernet camera, an image comprising a moving image of a work space including a mobile object comprising an automatic guide vehicle, a plurality of components, and at least one worker;

determine a component to be mounted to the mobile object based on at least one of first mobile object information indicating the mobile object in the acquired image, second mobile object information indicating a time when the mobile object appears in the work space, and third mobile object information indicating a position in which the mobile object is located before the mobile object appears in the work space;

cause a projector to project a first projection image including at least one of a first reference projection image indicating the component determined to be mounted to the mobile object, a second reference projection image indicating which of a plurality of mobile objects appearing in the work space the component should be mounted to, and a third reference projection image indicating a housing position of the mobile object;

generate a layout in which a position of the component in the work space is changed based on an analysis of a flow line along which the worker moves in the work space;

cause the projector to project a second projection image indicating the changed position of the component in the layout;

determine an order according to which the plurality of components are mounted to the mobile object;

cause the projector to project a third projection image indicating the order according to which the plurality of components are mounted to the mobile object;

instruct the automatic guide vehicle to autonomously travel within the work space based on transmitting a control signal to the automatic guide vehicle, the automatic guide vehicle being configured to autonomously travel within the work space in accordance with the instruction and in response to the control signal from the processor; and determine whether the plurality of components are to be mounted to the mobile object by matching the mobile object in the acquired image that is autonomously traveling within the work space with a stored mobile object image in a storage.

8. The non-transitory computer readable medium storing the information output program according to claim 7, wherein the information output program causes the computer to:

acquire, when the component is mounted to the mobile object, a plurality of flow lines along which a plurality of different workers move in the work space; and generate, when the layout is generated, the layout in which the component is disposed so that a part of the plurality of flow lines of the plurality of different workers where a difference therebetween is large is shortened.

9. The non-transitory computer readable medium storing the information output program according to claim 8, wherein the information output program causes the computer to generate, when the layout is generated, the layout in which a position of a third component is changed when a difference between the plurality of flow lines of the plurality of different workers from a second component to the third component is larger than that between the plurality of flow lines of the plurality of different workers from a first component to the second component.

\* \* \* \* \*